(12) United States Patent
Renn (10) Patent No.: US 7,700,172 B2
(45) Date of Patent: Apr. 20, 2010

(54) ARTICLES PREPARED FROM BIODEGRADABLE COMPOSITIONS AND MANUFACTURING METHODS

(75) Inventor: Donald W. Renn, Rockport, ME (US)

(73) Assignee: The Biodegradable Technologies General Partnership, Delta, British Columbia (CA)

( * ) Notice: Subject to any disclaimer, the term of this patent is extended or adjusted under 35 U.S.C. 154(b) by 0 days.

(21) Appl. No.: 12/491,029

(22) Filed: Jun. 24, 2009

(65) Prior Publication Data

US 2009/0263601 A1 Oct. 22, 2009

Related U.S. Application Data

(62) Division of application No. 11/454,272, filed on Jun. 16, 2006, now Pat. No. 7,618,485.

(51) Int. Cl.
*B65D 39/00* (2006.01)

(52) U.S. Cl. ............. 428/36.5; 428/36.4; 220/DIG. 30; 383/1; 524/916; 536/124; 536/126

(58) Field of Classification Search ............. 206/524.6, 206/524.7; 220/DIG. 30; 383/1; 428/36.5, 428/36.4; 524/916; 536/124, 126
See application file for complete search history.

(56) References Cited

U.S. PATENT DOCUMENTS

| | | |
|---|---|---|
| 5,160,368 A | 11/1992 | Begovich |
| 5,576,049 A | 11/1996 | Haas et al. |
| 5,580,624 A | 12/1996 | Andersen et al. |
| 5,691,014 A | 11/1997 | Andersen et al. |
| 5,738,921 A | 4/1998 | Anderson et al. |
| 6,589,328 B1 | 7/2003 | Nussinovitch |
| 2003/0047110 A1 | 3/2003 | Poovarodom et al. |
| 2003/0107145 A1 | 6/2003 | Ozasa et al. |
| 2003/0224022 A1 | 12/2003 | Nussinovitch |
| 2005/0075497 A1 | 4/2005 | Utz et al. |
| 2005/0137272 A1 | 6/2005 | Gaserod et al. |

*Primary Examiner*—Michael C Miggins
(74) *Attorney, Agent, or Firm*—Preti Flaherty Beliveau & Pachios LLP (57) ABSTRACT

A biodegradable container includes a body structure made of a foamed hydrocolloid gelling matrix system having a fibrous material and a firming agent embedded therein and a water-resistant coating disposed on a surface of the body structure.

12 Claims, 1 Drawing Sheet

ARTICLES PREPARED FROM BIODEGRADABLE COMPOSITIONS AND MANUFACTURING METHODS

CROSS REFERENCES TO RELATED APPLICATIONS

This application is a Divisional of copending U.S. patent application Ser. No. 11/454,272, filed Jun. 16, 2006 and hereby incorporated by reference.

BACKGROUND OF THE INVENTION

This invention relates generally to biodegradable compositions and more particularly to articles, such as containers and other items, formed from such biodegradable compositions.

The widespread use of polystyrene foam containers, which cannot be easily recycled, has led to significant disposal problems. Because they are meant to be disposable but do not decompose, polystyrene foam containers contribute greatly to the overfilling of landfills. Also, the manufacture of polystyrene foam, which typically requires the use of chlorofluorocarbons (CFCs), is a significant source of pollution and a drain on petroleum resources.

Accordingly, there has been great interest in developing biodegradable containers as substitutes for polystyrene foam containers. Because the consuming public has become accustomed to the feel and texture of polystyrene foam containers, it is desirable for biodegradable containers to have a similar feel and texture. Other advantageous properties for biodegradable containers include: being lightweight yet having structural integrity; being capable of holding boiling or hot water, being capable of withstanding microwave heating, and cost effective manufacture. However, development of biodegradable container having all of these properties has proved to be elusive. For instance, many biodegradable containers proposed to date are based on modified starches or biopolymer/polysaccharide foams. Such containers typically lack sufficient structural integrity and firmness, and the dried foam tends to be too brittle.

SUMMARY OF THE INVENTION

The present invention overcomes the above-mentioned problems by providing a biodegradable composition that includes a foamed gelling hydrocolloid system to which a firming agent and a fibrous material, with or without other optional components, are added. The present invention also provides articles of manufacture, such as biodegradable containers, prepared from such compositions. The articles of manufacture are coated with a suitable coating so as to be resistant or impervious to boiling water and able to withstand microwave heating. The invention further includes methods for making such articles.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification.

The invention, however, may be best understood by reference to the following description taken in conjunction with the accompanying drawing figures in which.

DETAILED DESCRIPTION OF THE INVENTION

The present invention relates to biodegradable compositions that are particularly suitable for the production of containers but can be used for other articles of manufacture and applications such as dressings for the treatment of wounds and insulation boards. In one embodiment, the biodegradable composition includes a matrix comprising a foamed gelling hydrocolloid system, a fibrous material mixed into the matrix, and a firming agent mixed into the matrix. The composition can further include a foaming agent and various other optional additives.

As used herein, a "foamed gelling hydrocolloid system" refers to one or more hydrocolloid gelling agents that have been processed into a foam. The hydrocolloid gelling agents of the present invention are preferably, but not necessarily, polysaccharides. For example, suitable hydrocolloid gelling agents or systems include: agar, agarose, aloe mannans/xanthan, aloe mannan (deacetylated), algin/alginates, water-insoluble alginates, borate complexes of 1,3-cis diols (locust bean gum, guar gum, cassia gum, konjac), carrageenans (kappa- or iota- with appropriate cations), cassia gum/xanthan, chitosan, chitosan/alginate, chitosan/carrageenan, curdlan (a beta-1,3-glucan), gellan (Na salts are elastic, Mg salts firm), guar gum/xanthan, hyaluronic acid, konjac, deacetylated konjac, konjac/xanthan, locust bean gum/xanthan, cassia/xanthan, pectins including low-methoxyl pectins, and combinations or derivatives thereof. The ratio of components and additives, such as gelling polysaccharides, determines the elasticity of the system.

Several of these systems form thermo-irreversible gels. These include deacetylated konjac, curdlan, calcium alginate, calcium low-methoxyl pectin, chitosan and chitosan complexes with carrageenan and alginates. Konjac will form a heat-set gel in the presence of an alkaline component that deacetylates the konjac when heated. If an aqueous slurry of curdlan is heated to about 100° C., a weak gel forms. In addition, an alkaline sol of curdlan is neutralized at 55° C. and if this is subsequently heated to greater than 80° C., a thermo-irreversible gel forms.

Other suitable hydrocolloid gelling agents or systems that are not polysaccharides include: gelatin, whey proteins, casein, casein/carrageenan, albumins, soy protein, enzyme treated milk proteins (rennet), chondroitin sulfates, polyvinyl alcohol/borate, block co-polymers (Pluronics® and Tetronics®), polyacrylamide, polylactic acid salts, and combinations or derivatives thereof.

The fibrous material is embedded into the matrix to prevent articles made from the composition from being too brittle. Suitable fibrous materials for this purpose include particulated cellulose fibers from a variety of sources including recycled paper, sugar-cane residues, corn stover, sugar beet residues, coconut husk (coir dust), cotton linters, citrus residues, sawdust, etc. and/or particulated fibers prepared from coagula or extruded fibers of water-insoluble biopolymers (e.g., calcium alginate). The fibrous material is preferably pre-hydrated to prevent water uptake from the gelling system materials or otherwise destroying the gelling structure.

The firming agent (which can also be referred to as a stiffening or hardening agent) is embedded into the matrix to provide strength and structural integrity to articles made from the composition. Suitable firming agents include one or more of the following: wheat flour, other flours (including pea), clays, sawdust, starches, and other water-insoluble, water-adsorbing and/or water-absorbing particulates. Like the fibrous material, the firming agent or agents are preferably pre-hydrated before being added to the composition.

A foaming agent may be included in the composition to aid foaming and/or stabilize the foam. Preferably, the foaming agent will produce a foam that lasts until gelling occurs. Generally, a foaming agent is a material that will release a gas under certain conditions (such as agitation and/or high temperature) so as to turn the gelling mixture sol into a foam. The foaming agent can comprise a single material or a mixture of materials that aid in foaming. Suitable materials include polymeric foaming agents, surfactants and mixtures thereof. Possible polymeric foaming agents include surface active hydrocolloids such as methyl cellulose, hydroxy propyl methyl cellulose (HPMC), hydroxy propyl cellulose (HPC), hydroxy ethyl cellulose (HEC), and glycol alginates. Examples of surfactants include sodium dodecyl sulfate (SDS), ethoxylates of sorbitan esters (i.e., TWEEN® surfactants), TERGITOL® cleaning compositions, lecithins, as well as pertinent derivatives of cellulose and other polysaccharides. Other possible polymeric foaming agents and surfactants are described in United States Patent Application Publication No. 2005/0137272, published Jun. 23, 2005 in the name of Olav Gaserod et al., which is incorporated by reference herein.

The composition can further include additives such as whitening materials, coloring agents, and humectants. Suitable humectants comprise one or more of glycerin, ethylene glycol, propylene glycol, mannitol, sorbitol, polyethylene glycols, and others. Further possible additives include insoluble fillers other than fibers, soluble hydrocolloid fillers, water-soluble additives such as cellulose derivatives and other water-soluble hydrocolloids, water-soluble polysaccharides and other property-altering small and polymeric molecules, and water-insoluble additives such as sand, clays, vermiculite, etc.

The compositions described above can be used to prepare articles of manufacture having a desired shape and a variety of desirable properties. One particular article of manufacture contemplated by the present invention is biodegradable containers. As used herein, the terms "container" or "containers" refer to any receptacle, vessel or the like that can be used for holding, storing, dispensing, packaging, or portioning items (including but not limited to food and beverage items), whether such use is intended to be short term or long term. Examples of "containers" include, but are not limited to, boxes, cups, bowls, trays, jars, bottles, plates, cartons, cases, crates, dishes, lids, straws, other types of holders, and cushioning materials therein. It will be appreciated that in certain circumstances the container may seal the contents from the external atmosphere and in other circumstances may merely hold or retain the items.

Figure 1:
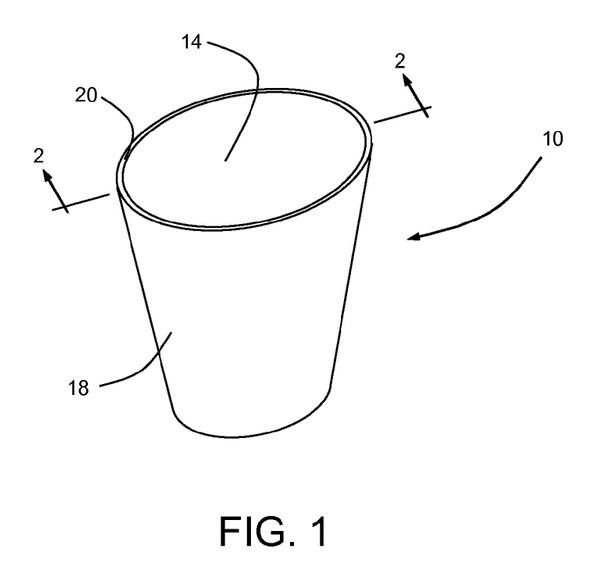
FIG. 1 is a perspective view of a representative biodegradable container.
Figure 2A:
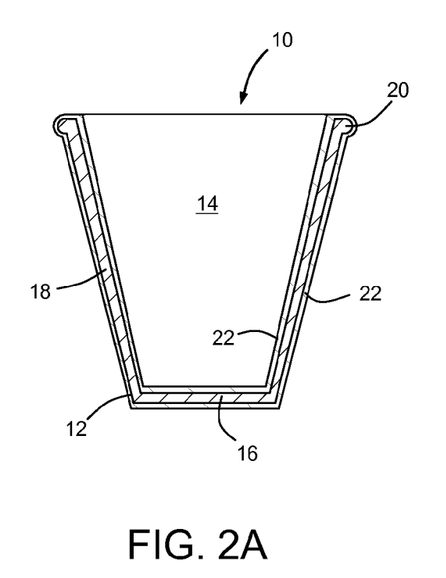
FIG. 2A is a cross-sectional view of the biodegradable container taken along line 2-2 of FIG. 1.
Figure 2B:
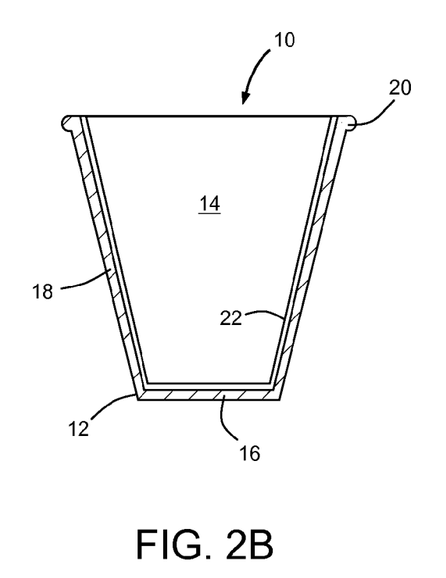
FIG. 2B is a cross-sectional view of an alternative embodiment of the biodegradable container taken along line 2-2 of FIG. 1.

Referring to FIGS. 1, 2A and 2B, a representative container 10 is shown. In the illustrated embodiment, the representative container 10 is a cup that includes a biodegradable body structure 12 formed into a desired shape to define an interior region 14 designed to hold the item or items to be stored in the container 10. Specifically, the body structure 12 has a bottom portion 16, a conical sidewall 18, and an upper rim 20 to which a cover (not shown) can be attached. The body structure 12 is made from the compositions described above and thus comprises a hydrocolloid gelling matrix system having a fibrous material and a firming agent embedded therein.

A protective coating 22 is disposed on a surface of the body structure 12. As shown in FIG. 2A, the coating 22 covers the entire surface of the body structure 12, both inside the interior region 14 and outside of the interior region 14. Alternatively, the coating 22 can be disposed on the body structure surface inside the interior region 14 only (which is the surface that items stored in the container would come in contact with) as shown in FIG. 2B. In one embodiment, the coating 22 can be biodegradable. Alternatively, the coating 22 can be made from a material or materials that are not biodegradable. In this case, the container 10 would still be essentially biodegradable because the biodegradable body structure 12, which comprises the bulk of the container 10, would still be able to decompose after disposal. (Because trash is typically ground, chopped or otherwise crushed prior to final disposal in a landfill, the body structure 12 will become exposed even when entirely covered by the coating 22.) When the container 10 is intended for use with food and/or beverages, the coating 22 should comprise a material that is: approved for contact with human comestibles, water-resistant (as used herein, the term "water-resistant" means being resistant or impervious to water and similar liquids, including hot or boiling liquids), able to withstand microwave heating, and grease-resistant. Suitable coating materials include: zein, chitin, hydrophobic derivatives of biopolymers, waxes, shellac (particularly food grade shellacs), lacquers (particularly food grade lacquers), Michelman's Vaporcoat 2200R, NuCoat's 6661B, Ulterion coatings, and other polymers. The whitening or coloring agent(s) described above as being an additive to the biodegradable composition alternatively can be incorporated in the coating 22.

One method for making an article of manufacture, such as a container from the biodegradable compositions set forth above is now described. The method begins by adding the desired hydrocolloid gelling agent or agents to solution and aerating or foaming the solution to produce the foamed gelling hydrocolloid system. If being used, the foaming agents are also added at this point. Aeration can be accomplished by any suitable technique such as whipping the solution with suitable means such as a mixer or the like. Other foaming techniques that could be employed include gas sparging in which the solution is agitated by injecting compressed air or gas and using a foam generator in which the solution is forced through a fritted glass under pressure. Another possible foaming technique is the use of pressure differentials; i.e., repeatedly subjecting the solution to high pressure and then suddenly releasing the pressure. Chemical reactions, including heat decomposition, and biological reactions (e.g., yeast) can also be used.

Once the solution has been foamed, the firming agent and fibrous material are added. As mentioned above, both of these components are pre-hydrated so as to avoid destroying the gelling structure. Typically, the firming agents and fibrous materials are separately added to respective solutions, which are then added to the foamed gelling hydrocolloid system. This combination is then aerated again. The hydrocolloid gelling agents, firming agents and fibrous materials are provided in appropriate amounts to produce the desired properties. Generally, the concentration of the hydrocolloid gelling agent in the aqueous solution is typically about 0.5 percent by weight (e.g., 0.5 grams of gelling agent for every 100 grams of water) to about 6 percent by weight, and preferably about 2 percent by weight to about 6 percent by weight. The concentration of the firming agent in the aqueous solution is typically about 2 percent by weight to about 20 percent by weight, and preferably about 6 percent by weight to about 18 percent by weight. The fibrous material concentration is generally about 2 percent by weight to about 30 percent by weight, and preferably about 4 percent by weight to about 25 percent by weight.

Next, any further additives, such as whitening materials, coloring agents, fillers, humectants and the like, that may be desired are added, and the conglomeration is again aerated. All of these foregoing steps are performed under appropriate conditions, (which most commonly means maintaining a proper temperature) so as to prevent gelling.

At this point, the foamed gelling hydrocolloid system with additives is poured or injected into the appropriate mold for the article of manufacture being made. The foamed gelling hydrocolloid system is then gelled in the mold. Gelling is accomplished by an appropriate technique depending on the nature of the system components. This can include cooling, heating, or simply the passage of time. After the system has gelled, the resultant body structure is removed from the mold and dried. Drying methods can include quiescent, forced air, infrared light banks, vacuum, water-miscible solvents, freeze-drying, and superheated steam.

The final step is to apply the protective coating discussed above. As previously mentioned, the coating can cover the entire surface of the body structure or only a portion of the body structure surface, such as the portion of the surface that items being stored in the article could come in contact with. Suitable coating methods include dipping, spraying, using an applicator, and incorporating the coating into the mix.

EXAMPLES

Konjac and De-acetylated Konjac Gel Foam-based Matrices

Example 1

Foamed Deacetylated Konjac Matrix

Three grams of konjac powder (Shimizu PROPOL A, Lot AEH 17) was suspended in 300 ml of cold tap water using a Rival hand-blender. The vessel was covered with plastic wrap and heated to boiling in a microwave oven. To this was added 2 ml of glycerin and 2 ml of Ajax dishwashing detergent and the mixture whipped to firm peaks using a Black and Decker hand mixer using highest speed setting. The foamed material was divided into equal portions.

1st portion: One gram of lime was added as a slurry in 10 ml of cold tap water and rapidly mixed in thoroughly. The foam mixture was placed in muffin cups, covered with plastic wrap and placed in a 200° F. oven for one hour to de-acetylate and set the konjac. The plastic cover was removed and the foam dried in a 170° F. convection oven. The dry material was too soft and flexible to be used for containers.

$2^{nd}$ portion: Same as the first portion except that 5 grams of powdered citrus waste (CitraSorb, SLG Processing) was added before de-acetylation. The dried product was too weak and flexible to be used for the intended applications.

Example 2

Foamed Deacetylated Konjac/Paper Fiber Matrix

Three grams of konjac powder (Shimizu PROPOL A, Lot AEH 17) was suspended in 300 ml of cold tap water using a Rival hand-blender. The vessel was covered with plastic wrap and heated to boiling in a microwave oven. To this was added 2 ml of glycerin and 2 ml of Ajax dishwashing detergent and the mixture whipped to firm peaks using a Black and Decker hand mixer using highest speed setting. A cellulose fiber preparation was made by placing 6 g of toilet paper in 500 ml of hot water and macerating it using a Rival hand-held blender. The water was removed using a strainer. The wet cellulose fibers were added to the konjac foam mixture and the mixture again whipped to stiff peaks. One gram of garden lime was added and mixed in quickly. The foam preparation was divided into two portions. The first portion was placed in muffin cups, heated at 200° F. for 1 hr to de-acetylate and insolubilize the konjac. Drying was done at 170° F. in a convection oven. The dried composition did not have sufficient structural rigidity.

Foamed de-acetylated konjac/paper fiber/flour matrix: To the second portion was added about 40 g of unbleached wheat flour slurried in cold tap water and the mixture again whipped to stiff peaks. The foamed composition was portioned in muffin cups, heated at 200° F. for 1 hr to de-acetylate and insolubilize the konjac. Drying was done at 170° F. in a convection oven. The dried composition was stiff, but a bit crumbly, indicating the addition of too much flour, but this experiment showed that flour could be used as a "firming agent".

Example 3

Deacetylated Konjac Matrix

Using a Rival hand-held blender and a 2-liter glass bowl, 3 g of konjac powder (Shimizu PROPOL A, Lot AEH17) was dispersed into 300 ml of water using a Rival hand-held blender. This was covered with plastic wrap and heated to boiling in a microwave oven, then allowed to cool to room temperature. To 100 ml of the konjac sol was added 2 ml of glycerin and 2 ml of Ajax® dish liquid detergent. Using a Black & Decker hand-held mixer at high speed, this mixture was whipped to stiff peak consistency. One gram of garden lime as a slurry in 10 ml of water was added and whipped in. This mixture was put into concentric cupcake cups, the cups covered with plastic wrap, and placed in a 200° F. oven to deacetylate, and therefore gel the konjac. After one hour, the plastic film was removed and the cups were placed in a 170° F. convection oven to dry. The dried konjac foam pieces were too soft and flexible to use for food and beverage containers.

Example 4

Deacetylated Konjac/Flour

To 200 ml of 1% konjac sol, prepared as in Example 1 was added 2 ml of glycerin and 2 ml of Ajax dish liquid detergent. This mixture was whipped to stiff-peak consistency using a Black & Decker hand-held mixer set at high speed. 8 g of Shaw's bleached all-purpose wheat flour was slurried in 30 ml of cold water was added and the mixture again whipped to stiff-peak consistency. To set this foamed mixture to a gel when heated, 2.5 ml of 1$\underline{M}$ NaOH was added and mixed in thoroughly using the mixer. This mixture was put into 2 plastic-film lined, round glass baking dishes, then the dishes were covered with plastic film and placed in a 195° F. oven to deacetylate, and therefore gel the konjac. After one hour, the covering plastic film was removed and the gelled foams partially dried. The partially dried materials were removed from the dishes and molded over paper bowls with the bottom layer of the plastic film between the partially dried gelled foam and the paper bowl. Drying was completed in a 175° F. convection oven. While the dried bowls maintained their shape, they lacked strength and cracked under slight pressure.

Example 5

Deacetylated Konjac/Paper Fibers/Flour

To 300 g of 1% konjac sol, prepared as in Example 1 was added 3 ml of glycerin, 3 ml of Ajax dish liquid detergent, and 15 g (dry wt.) of paper fiber prepared by placing 15 g of toilet paper in hot water, macerating with the Rival hand-held blender, then collecting it on a sieve. This mixture was whipped to stiff-peak consistency using a Black & Decker hand-held mixer set at high speed. After adding 15 g dry bleached wheat flour (Shaw's), the mixture was again whipped to stiff peaks. To this was added 4 ml of 1M NaOH and rapidly thoroughly whipped in. The mixture was divided in two portions, each put into a plastic film-lined rectangular glass baking dish. Plastic film was used to cover the dishes and they were placed in a 190° F. convection oven to deacetylate the konjac and set the gel foam. After one hour, the plastic covers were then removed and the material partially dried. This was molded over the bottoms of inverted bread pans by lifting the partially dried gelled foam, using the plastic lining, and lightly pressing it into shape. After drying, the trays were coated with Michelman VaporCoat®2200R and cured at 220° F. after each application. The trays had excellent structural properties. This composition was also used to prepare cups and bowls.

Example 6

Deacetylated Konjac/Flour/Cellulosics

Samples of expanded cellulosics prepared from agricultural wastes (including corn stovers, sugar beet pulp, citrus pulp, wheat straw, etc.) by Fiberstar, Inc. (Ellsworth, Wis.) using processes described in U.S. Pat. No. 6,506,435 and Published US Patent Application 20030116289 were obtained. These were used in place of the paper fibers described in the foregoing examples. Although all 7 were tried with good results, this experiment describes only the use of the expanded sugar beet pulp.

To 100 g of a 1% konjac sol (Shimizu, PROPOL A, lot AEH17) at room temperature, prepared as described in Example 1, was added 1 ml of glycerin and 1 ml of Ajax® dish fluid detergent. This was whipped to stiff peak consistency using a hand-held Black & Decker mixer at high speed. A slurry of 10 g of wheat flour and 10 g of the Fiberstar® expanded sugar beet pulp in 60 ml of cold water was added and the mixture again whipped to stiff peaks. As the gelling agent, 1 ml of 1 M NaOH was added and mixed in rapidly, yet thoroughly. The mixture was transferred to a plastic film lined paper soup bowl and the mixture shaped by putting plastic film on top of it. The foamed mixture was set to a gelled foam by placing the bowl in a 195° F. oven for one hour to deacetylate the konjac. The covering plastic film was removed and the foamed gel mixture was dried in a 195° F. convection, after which the bottom plastic wrap was removed. The bowl-shaped product was good, but a bit weak.

Example 7

Deacetylated Konjac/Paper Fiber/HPC

To 100 g of 1.5% Konjac sol (prepared as in Example 1) in a 2-l measuring bowl was added 5 g of hydroxypropyl cellulose (Hercules LF, lot 8931) dissolved in 30 ml of cold water, 1 ml of glycerin, and 1 ml of Ajax® dish fluid detergent. This was whipped to stiff peak consistency using a Black & Decker hand-held mixer. 6 g (dry weight) sieved, water-macerated toilet paper was added and the mixture again whipped to stiff peaks. To this was added 2 ml of 1M NaOH which was mixed in rapidly and thoroughly. Concentric bowls were treated with a 5% sol of PVA (Air Products WS-42) as a mold release and used to mold the whipped mixture. The bowls were covered with plastic film placed in a 195° F. oven to deacetylate and set the konjac. After one hour, the outer mold (bowl) was removed and the inner mold with the gelled foam mixture on the outside inverted. These were dried in a convection oven set at 170° F. When nearly dry, the bowls were removed from their molds and drying was finished in the convection oven. The bowls were somewhat thin, but strong.

Example 8

Deacetylated Konjac/Paper Fibers/HEC/Flour

To 400 ml of a 1.5% konjac sol (Shimizu, PROPOL A, lot AEH17), prepared as Example 1, 1 ml of glycerin and 1 ml of Ajax® dish fluid detergent in a 2-liter measuring bowl at room temperature, was added 20 g of hydroxyethyl cellulose (Hercules 250LR PA, lot 23343) slurried in 30 ml of cold water. This was mixed in thoroughly using a Black & Decker hand-held mixer at low speed. To this was added 4 ml of glycerin, 4 ml of Ajax dish fluid detergent, and 24 g (dry wt.) of paper fiber prepared by placing 24 g of toilet paper in hot water, macerating with the Rival hand-held blender, then collecting it on a sieve. This mixture was whipped to stiff-peak consistency using the mixer at high speed. After adding 18 g of dry wheat flour, the mixture was again whipped. To set this foam to a gel when heated, 6 ml of 1M NaOH was added and mixed in thoroughly using the mixer. Concentric bowls and cups were treated with a 5% sol of PVA (Air Products WS-42) as a mold release and used to mold the whipped mixture. The cups and bowls were covered with plastic film placed in a 195° F. oven to deacetylate and set the konjac. After one hour, the outer mold (cup, bowl) was removed and the inner mold with the gelled foam mixture on the outside inverted. These were dried in a convection oven set at 170° F. When nearly dry, the cups and bowls were removed from their molds and drying was finished in the convection oven. Using a paintbrush, after trimming the excess material from the tops, the items were coated in stages using Michelman 2200R VaporCoat, each time curing at 220° F. before the next application. The bowls and cups exhibited excellent strength and withstood boiling water for 20 minutes without softening. When cold water in them was subjected to microwave heating, the water was brought to boiling with no matrix softening.

Example 9

Deacetylated Konjac/Sand

To 400 ml of a 1.5% konjac sol (Shimizu, PROPOL A, lot AEH17), prepared as Example 1, in a 2-liter measuring bowl at room temperature, was added 4 ml of glycerin, and 4 ml of Ajax dish fluid detergent. This mixture was whipped to stiff-peak consistency using the mixer at high speed. After adding 200 g garden sand, the mixture was again whipped. To set this foam to a gel when heated, 6 ml of 1M NaOH was added and mixed in thoroughly using the mixer. Concentric bowls and cups were treated with a 5% sol of PVA (Air Products WS-42) as a mold release and used to mold the whipped mixture. The cups and bowls were covered with plastic film placed in a 195° F. oven to deacetylate and set the konjac. After one hour, the outer mold (cup, bowl) was removed and the inner mold with the gelled foam mixture on the outside inverted. These were dried in a convection oven set at 170° F. When nearly dry, the cups and bowls were removed from their molds and drying was finished in the convection oven. The dry bowls and cups were fragile and fell apart when handled.

Example 10

Deacetylated Konjac/Flour/Sand

To 200 g of 1.5% Konjac sol (prepared as in Example 1) in a 2-l measuring bowl was added 3 ml of glycerin, and 2 ml of Ajax® dish fluid detergent. This was whipped to stiff peak consistency using a Black & Decker hand-held mixer. 10 g of dry wheat flour was added and the mixture again whipped to stiff peaks, followed by the addition of 100 g of garden sand, again whipping to stiff peaks. To this mixture was added 3 ml of 1$\underline{M}$ NaOH which was mixed in rapidly and thoroughly. Two sets of concentric bowls were treated with a 5% sol of PVA (Air Products WS-42) as a mold release and used to mold the whipped mixture. The bowls were covered with plastic film placed in a 195° F. oven to deacetylate and set the konjac. After one hour, the outer molds (bowls) were removed and the inner molds with the gelled foam mixture on the outside were inverted. These were dried in a convection oven set at 170° F. When nearly dry, the bowls were removed from their molds and drying was finished in the convection oven. Without a fibrous binder, the dry bowls were too fragile.

Example 11

Deacetylated Konjac/Paper Fibers/Flour/Sand

To 400 ml of a 1.5% konjac sol (Shimizu, PROPOL A, lot AEH17), prepared as Example 1 in a 2-liter measuring bowl at room temperature, was added 4 ml of glycerin, 4 ml of Ajax dish fluid detergent, and 20 g (dry wt.) of paper fiber prepared by placing 20 g of toilet paper in hot water, macerating with the Rival hand-held blender, then collecting it on a sieve. This mixture was whipped to stiff-peak consistency using the mixer at high speed. After adding 20 g of dry wheat flour, the mixture was again whipped. 200 g of garden sand was added and the mixture again whipped to stiff peak consistency. To set this foam to a gel when heated, 6 ml of 1$\underline{M}$ NaOH was added and mixed in thoroughly using the mixer. Concentric bowls and cups were treated with a 5% sol of PVA (Air Products WS-42) as a mold release and used to mold the whipped mixture. The cups and bowls were covered with plastic film placed in a 195° F. oven to deacetylate and set the konjac. After one hour, the outer mold (cup, bowl) was removed and the inner mold with the gelled foam mixture on the outside inverted. These were dried in a convection oven set at 170° F. When nearly dry, the cups and bowls were removed from their molds and drying was finished in the convection oven. Using a paint brush, after trimming the excess material from the tops, the items were coated in stages using Michelman 2200R VaporCoat, each time curing at 220° F. before the next application. The bowls and cups exhibited excellent strength and withstood boiling water for 20 minutes without softening. When cold water in them was subjected to microwave heating, the water was brought to boiling with no matrix softening.

Example 12

Cold-melt Deacetylated Konjac Matrices

The gel strength of deacetylated konjac varies inversely with the temperature and will form a sol at about 4° C. This sol can be whipped to a foam which can then set by raising the temperature. This can be the basis of a variety of biodegradable compositions.

Konjac/Xanthan Foam—based Matrices

Example 13

Foamed Konjac/Xanthan/Paper Fiber/Flour Matrix

A dry mix containing 1 g of konjac (Shimizu PROPOL A, Lot AEH17) and 1 g of xanthan (Keltrol Lot 31747V) was dispersed in 200 ml of cool tap water using a Rival hand-held blender. This mixture was heated to boiling in a microwave oven. While hot, 2 g of glycerin, 2 ml of the Ajax dishwashing fluid, and 6 g of toilet paper, treated as in Example 2, were added and the mixture whipped to stiff peak consistency. Forty grams of unbleached flour slurried in cool tap water was added and whipped in. The foamed mixture was placed into baking cups and allowed to set at room temperature. Drying was done at 170° F. in a convection oven. The dry foam product was too stiff and somewhat friable, again indicating too much flour was used.

Example 14

Konjac/Xanthan/Paper Fiber

A dry mixture of 1 g of konjac (Shimizu PROPOL A, lot AEH17) and 1 g xanthan (Kelco Keltrol, lot 31747V) was dispersed into 200 ml of water using a Rival hand-held blender. The 2-l measuring bowl containing this dispersion was covered with plastic film and the contents heated to boiling in a microwave oven. Since the konjac/xanthan sol forms a gel at about 70° C., the working temperature had to be maintained above this. While hot, 2 g of glycerin, 2 ml of Ajax® dish fluid detergent, and 6 g (dry wt.) of sieved, wet macerated toilet paper (see Example 1) were added. Using a Black & Decker hand-held mixer, the mixture was whipped to stiff peak consistency. Three baking cups were filled with this foamed composition and after gelling at room temperature, the material was dried in a 170° F. convection oven. The dried gelled foam was quite light but too flexible to be used for food and beverage containers.

Example 15

De-acetylated Konjac/Xanthan/Paper Fiber Matrix

Same as Example 14, except that 0.5 g of lime slurried in 10 ml of hot water was substituted for the flour. Foamed mixture was refrigerated for 1.5 hours to set and then the konjac was de-acetylated by heating at 175° F. Drying was done at 170°

F. in a convection oven. The dry foam product was somewhat rigid but could have benefited by the addition of flour.

Agar Foam-based Matrices

Example 16

Foamed Agar/Paper Fiber/Flour Matrix

Two grams of agar (Sigma purified) was suspended in 100 ml of cool tap water and heated to boiling to dissolve the agar. While hot, 1 ml of glycerin and 1 ml of Ajax dishwashing fluid were added along with 4 g of toilet paper treated as in Example 2. About 40 g of unbleached flour slurried in water was added and the mixture whipped to stiff peaks. This was put into a glass baking dish, covered with plastic wrap, and placed into a refrigerator to set the agar-based matrix. Drying was done at 170° F. in a convection oven. The dry foam product was too stiff and somewhat friable, again indicating too much flour, but showing that flour could be used to give rigidity to the composition.

Example 17

Foamed Agar/Paper Fiber/Flour Matrix

Twelve grams of Marine BioProducts agar (Lot: M0199-0004) was added to 300 ml of cool tap water and allowed to swell for about 15 minutes. This mixture was heated to boiling using a microwave oven, then mixed with a Rival hand-held, high-shear blender. After adding 1.5 ml of glycerin and 3 ml of Ajax dishwashing fluid, the mixture was whipped to stiff-peak consistency using a Black and Decker hand-held mixer. Macerated toilet paper (18 g) prepared as in Example 2, was added and mixed in using the Rival high-shear blender. Fifteen grams of flour, slurried in 30 ml of cool tap water, was added and mixed in thoroughly using the Black and Decker mixer. Three bowls and one cup were molded in concentric molds. These were covered with plastic wrap and refrigerated for one hour then un-molded, leaving the gel foams on the inner mold. After inverting, these were dried in a 180° F. convection oven. Excellent properties! The cup was subsequently coated with NuCoat 6616b. Curing was done using a microwave oven for 15 seconds. The cured, coated cup held several changes of boiling water without softening and cold water could be brought to boiling in a microwave oven without softening.

Example 18

Foamed Agar/Cellulose Fiber/Flour Matrix

Same as Example 17 except that the toilet paper was replaced by CreaTech® TC 2500 cellulose fiber (Creafill Fibers, Chestertown, Md.). This was pre-hydrated by adding sufficient 190° F. water to cover the fiber, blending with a Rival hand-held, high-shear blender, then sieving to remove the excess water. Two bowls and two cups were molded. These had similar properties to those in Sample 15a indicating that the substitution gave satisfactory results.

Example 19

Foamed Agar Matrix

Using a 2-l glass measuring bowl, a 2% agar sol was prepared by slurrying 2 g of agar (Marine BioProducts Plant Propagation Agar, lot 010106) in 100 ml of water covering the bowl with plastic film and heating the contents to boiling using a microwave oven. To this was added, 1 ml of glycerin and 1 ml of Ajax® dish fluid detergent. The bowl was placed in a larger bowl containing very hot water and the agar sol mixture whipped to stiff peak consistency using a Black & Decker hand-held mixer. The foam was transferred to a plastic film lined round glass baking dish, covered with plastic film and refrigerated for one hour to set the agar to a gelled foam. The plastic film cover was removed and the gelled foam partially dried in a 175° F. convection oven. The foam was removed from the dish while still attached to the plastic film. This was molded over a paper bowl and dried completely. The dried foam matrix was too flexible to be practical. The formulation needs to be modified to include a stiffener, such as flour, and a fibrous material.

Example 20

Agar/Paper Fiber Matrix

Using a 2-l glass measuring bowl, a 2% agar sol was prepared by slurrying 2 g of agar (Marine BioProducts Plant Propagation Agar, lot 010106) in 100 ml of water covering the bowl with plastic film and heating the contents to boiling using a microwave oven. To this was added, 1 ml of glycerin and 1 ml of Ajax® dish fluid detergent. The bowl was placed in a larger bowl containing very hot water and the agar sol mixture whipped to stiff peak consistency using a Black & Decker hand-held mixer. 7 g (dry wt.) of sieved macerated toilet paper was added and the mixture whipped again to stiff peaks. The foam was transferred to two plastic film lined round glass baking dishes, covered with plastic film and refrigerated for one hour to set the agar to a gelled foam. The plastic film covers were removed and the gelled foams partially dried in a 175° F. convection oven. The foams were removed from the dishes while still attached to the plastic films. These were molded over paper bowls and dried completely. The dried foam matrix was too flexible to be practical. The formulation needs to be modified to include a stiffener, such as flour.

Example 21

Agar/Flour

Example 16 was repeated with the addition of 20 g of wheat flour slurried in 50 ml of water after the agar sol was whipped to stiff peak consistency. The mixture was again whipped to stiff peaks. The foam was transferred to two plastic film lined round glass baking dishes, covered with plastic film and refrigerated for one hour to set the agar to a gelled foam. The plastic film covers were removed and the gelled foams dried in a 175° F. convection oven, then stripped from the plastic films. The dried foams were stiffer than without the flour but became somewhat friable., an indication of too much flour.

Example 22

Agar/Sand

Using a 2-l glass measuring bowl, a 4% agar sol was prepared by slurrying 8 g of agar (Marine BioProducts Plant Agar) in 200 ml of water covering the bowl with plastic film and heating the contents to boiling using a microwave oven. To this was added 2 ml of glycerin and 2 ml of Ajax® dish fluid detergent. The bowl was placed in a larger bowl containing very hot water and the agar sol mixture whipped to stiff peak consistency using a Black & Decker hand-held mixer. After adding 100 g of garden sand, the mixture was again whipped to stiff peaks. Concentric bowls and cups were treated with a 5% sol of PVA (Air Products WS-42) as a mold release and used to mold the whipped mixture. The cups and bowls were covered with plastic film refrigerated. After one hour, the outer mold (cup, bowl) was removed and the inner mold with the gelled foam mixture on the outside inverted. These were dried in a convection oven set at 170° F. When nearly dry, the cups and bowls were removed from their molds and drying was finished in the convection oven. Using a paint brush, after trimming the excess material from the tops, the items were coated in stages using Michelman 2200R VaporCoat, each time curing at 220° F. before the next application. The bowls and cups exhibited excellent strength and withstood boiling water for 20 minutes twice successively without softening. When cold water in them was subjected to microwave heating, the water was brought to boiling with no matrix softening.

Example 23

Agar/HEC

To 400 ml of a hot 4% agar sol (Marine BioProducts plant agar) in a 2-l measuring bowl was added a fresh slurry of 8 g of hydroxyethyl cellulose (Hercules 250 HR, lot 23630) in cold water. The HEC was rapidly mixed in using a Black & Decker hand-held mixer then the mixture reheated to boiling in a microwave oven, To this was added 4 ml of glycerin and 4 ml of Ajax® dish fluid detergent and the mixture whipped to stiff peak consistency. Concentric bowls and cups were treated with a 5% sol of PVA (Air Products WS-42) as a mold release and used to mold the whipped mixture. The cups and bowls were covered with plastic film refrigerated. After one hour, the outer mold (cup, bowl) was removed and the inner mold with the gelled foam mixture on the outside inverted. These were dried in a convection oven set at 175° F. When nearly dry, the cups and bowls were removed from their molds and drying was finished in the convection oven. Products were interesting, but brittle.

Example 24

Agar/HEC/Flour

The procedure described in Example 23 was repeated but before molding, 20 g of wheat flour (Shaw's) was slurried in 40 ml of cold water, added to the whipped mixture, the mixture whipped to stiff peaks, reheated to boiling in a microwave oven, and whipped again. One portion (about ⅓ rd) was put into a plastic film lined rectangular glass baking dish, the dish covered with plastic wrap and refrigerated to gel the agar-foam matrix. The other ⅔ rd was used to prepare cups and bowls. Concentric bowls and cups were treated with a 5% sol of PVA (Air Products WS-42) as a mold release and used to mold the whipped mixture. The cups and bowls were covered with plastic film refrigerated. After one hour, the outer mold (cup, bowl) was removed and the inner mold with the gelled foam mixture on the outside inverted. These were dried in a convection oven set at 175° F. When nearly dry, the cups and bowls were removed from their molds and drying was finished in the convection oven. The gelled foam in the baking dish was partially dried at 175° F. then molded over the bottom of an inverted bread pan with the plastic film next to the pan. Drying was completed. Products were thin and too flexible.

Example 25

Agar/HEC/Paper Fiber

To 200 ml of a hot 4% agar sol in a 2-l measuring bowl was added a slurry of 4 g of hydroxyethyl cellulose (Hercules 250 HR, lot 23630). This was mixed in thoroughly using a Black & Decker hand-held mixer. To this was added 2 ml of glycerin, 2 ml of Ajax® dish fluid, and 10 g (dry weight) of sieved, wet macerated toilet paper (see Example 2). The mixture was heated to boiling in a microwave oven and then whipped to stiff peak consistency. Two concentric bowls and two concentric cups were treated with a 5% sol of PVA (Air Products WS-42) as a mold release and used to mold the whipped mixture. The bowls and cups were covered with plastic film and refrigerated. After one hour, the outer molds were removed and the inner molds with the gelled foam mixtures on the outside were inverted. These were dried in a convection oven set at 170° F. When nearly dry, the bowl and cup were removed from the molds and drying was finished in the convection oven. The products were very light and rather flexible.

Example 26

Agar/HEC/Paper Fiber/Flour

The same procedure as described in Example 25 was used with the addition of flour. Before molding, 10 g of wheat flour was added and whipped in. (Repeat experiments showed that the flour could be added dry or slurried in cold water with similar results.) The cups and bowls were light and strong. Selected samples were coated to make them water resistant. Using a paint brush, the items were coated in stages using Michelman 2200R VaporCoat, each time curing at 220° F. before the next application. The bowls and cups exhibited excellent strength and withstood boiling water for 20 minutes without softening. When cold water in them was subjected to microwave heating, the water was brought to boiling with no matrix softening.

In another experiment, a tray was prepared by putting the foam mixture into a plastic film lined rectangular glass baking dish, covering the dish with plastic wrap, and refrigerating to gel the agar-foam matrix. The gelled foam in the baking dish was partially dried at 175° F., after removing the plastic film covering. The partially dried foam slab was molded over the bottom of an inverted bread pan with the plastic film next to the pan. Drying was completed. The resulting tray was a bit distorted, but was light and strong.

Example 27

Agar/HEC/Sugar Beet Pulp Waste

The procedure described in Example 25 was used with the addition, before molding, of Fiberstar's expanded sugar beet pulp. 20 g of the beet pulp was wet with 40 ml of water and whipped into the previously whipped mixture. The molded, set, and dried cup and bowl were hard and somewhat brittle. As is, the formulation was less than satisfactory but could easily be adjusted and indicates that beet pulp is a viable additive.

Example 28

Agar/HEC/Citrus Pulp Waste

The procedure described in Example 25 was used with the substitution of citrus pulp for the sugar beet pulp. The dried cup and bowl were brownish, hard, and somewhat brittle. As is, the formulation was less than satisfactory but could easily be adjusted and indicates that citrus waste is a viable additive.

Example 29

Agar/HEC/Sand

Using a 2 liter measuring bowl, 16 g of agar (Marine Bioproducts) was added to 400 ml of water. The mixture was stirred briefly, the bowl covered with plastic film and the contents heated to boiling in a microwave oven to dissolve the agar. 8 g of hydroxyethyl cellulose (Hercules 250 HR, lot 23630) was slurried in 40 ml cold water and added to the agar sol, dispersed with a Rival hand-held blender and the mixture re-heated to boiling. To this was added 4 ml of glycerin and 4 ml of Ajax® dish liquid. The mixture was then whipped to stiff peaks using a Black & Decker hand held mixer. 200 g of garden sand was added and again the mixture was whipped to stiff peaks. Two concentric bowls were treated with a 5% sol of PVA (Air Products WS-42) as a mold release and used to mold the whipped mixture. The bowl was covered with plastic film and allowed to stand at room temperature for one hour to allow the alginate foam to set by the diffusion of the calcium. After one hour, the outer bowl mold was removed and the inner mold with the gelled foam mixture on the outside inverted. This were dried in a convection oven set at 170° F. When nearly dry, the bowl was removed from the mold and drying was finished in the convection oven. Using a paint brush, after trimming the excess material from the tops, the bowl was coated in stages using Michelman 2200R Vapor-Coat®, each time curing at 220° F. before the next application. The bowl exhibited moderate strength and withstood boiling water for 20 minutes twice successively without softening. When cold water in them was subjected to microwave heating, the water was brought to boiling with no matrix softening.

Calcium Alginate Foam-based Matrices

Example 30

Foamed Alginate/Paper Fiber Matrix

Using a 2-l measuring bowl, 3 g of alginate (Grindsted FD155) was dispersed in 100 ml of cold water using a Rival hand-held blender. The bowl was covered with plastic film and this slurry heated to boiling in a microwave oven to form a clear sol. After cooling to room temperature, 1 ml of glycerin, 2 ml of Ajax® dish fluid detergent, and 6 g (dry wt.) of sieved macerated toilet paper (see Example 2) were added. This mixture was whipped to stiff peak consistency using a Black & Decker hand-held mixer. About ½ teaspoon of lime was added as a slurry in 10 ml of water was added and mixed in rapidly. The foam was transferred to a plastic film lined round glass baking dish, the dish covered with plastic wrap. This was allowed to stand at room temperature for one hour to allow the calcium ions to diffuse and gel the alginate in the foamed mixture. The covering plastic film was removed and the gelled foam was dried in a 170° F. convection oven. The dried foam sheet was light and fairly rigid.

Example 31

Sodium Alginate/Paper Fiber/Flour/Lime

A 2% sodium alginate (ISP Alginates, Manugel DMB, lot220732) sol was prepared in a 2-l measuring bowl by dispersing 2 g of the alginate powder in 100 ml of water using a Rival hand-held blender. The bowl was covered with plastic wrap and the contents brought to boiling in a microwave oven. Blending was repeated and the sol was allowed to cool to room temperature. To this was added 1 ml of glycerin, 1 ml of Ajax® dish fluid detergent, and 8 g (dry weight) of sieved, macerated in hot water, toilet paper. This mixture was whipped to stiff peak-consistency using a Black & Decker hand-held mixer set at high speed. A dry mixture of 2 g of garden lime and 5 g of bleached wheat flour (Shaw's) was added and rapidly whipped in. Concentric bowls and cups were treated with a 5% sol of PVA (Air Products WS-42) as a mold release and used to mold the whipped mixture. The cups and bowls were covered with plastic film placed let stand at room temperature for the calcium ions to diffuse and gel the alginate. After one hour, the outer mold (cup, bowl) was removed and the inner mold with the gelled foam mixture on the outside inverted. These were dried in a convection oven set at 170° F. When nearly dry, the cups and bowls were removed from their molds and drying was finished in the convection oven. The dried bowls showed very little shrinkage and had a dry foam appearance. The formulation was very interesting in that it was one of the few that did not show significant shrinkage.

Example 32

Sodium Alginate/Paper Fiber/Flour/TSPP/CaSO$_4$

A 2% alginate sol (Prime Algin F200) was prepared by suspending 6 g of the algin in 300 ml of cool tap water using a Rival hand-held blender. This was heated to boiling using a microwave oven. After adding 3 ml of glycerin and 3 ml of Ajax dishwashing fluid, the mixture was whipped to stiff peak consistency using a hand-held Black and Decker mixer. After adding 1 g of tetrasodium pyrophosphate, as a set time modifier for the CaSO$_4$, and 18 g of toilet paper treated as in Example 2, the mixture was again whipped. A dry mix of 8 g of CaSO$_4$ and 15 g of flour was slurried in cool tap water and added to the mix The mixture was again whipped thoroughly. The foamed mixture was poured in between two concentric bowl molds and a plastic-lined baking dish. These were covered with plastic wrap and let stand at room temperature for one half hour to set. The plastic film covers were removed and the outer bowl of each mold was removed and the inner bows were inverted. Drying was done in a 200° F. convection oven. The dry foam products were removed from the molds and coated with NuCoat 6616B and the coating cured in a 250° F. convection oven. (Later, p. 173. it was found that curing could be done in less than 15 seconds using a microwave oven.). The coated and cured bowls and trays were impervious to hot water.

Example 33

Sodium Alginate/Cellulose Fiber/Flour/TSPP/CaSO$_4$

Same as Example 32 except that the toilet paper was replaced by CreaTech® TC 2500 cellulose fiber (Creafill Fibers, Chestertown, MD). This was pre-hydrated by adding sufficient 190° F. water to cover the fiber, blending with a Rival hand-held, high-shear blender, then sieving to remove the excess water. Two bowls and two cups were molded.

These had similar properties to those in Sample 28 indicating that the substitution gave satisfactory results.

Carrageenan Foam-based Matrices

The gelling carrageenans, kappa- and iota-, have given gelled foam products with acceptable properties. It is unfortunate that under anaerobic conditions, one of the breakdown products of these sulfated polysaccharides is hydrogen sulfide.

Example 34 k-carrageenan/Paper Fiber

Using a 2-l glass measuring bowl, 8 g of kappa-carrageenan (FMC Gelcarin® GP-379NF, lot ZA702) was dispersed in 200 ml of water using a Rival hand-held blender. The bowl was covered with plastic film and the contents heated to boiling in a microwave oven. After the covering film was removed, 2 ml of glycerin, 2 ml of Ajax® dish fluid detergent, and 7 g (dry wt.) of sieved, wet macerated toilet paper (see Example 1) were added and the mixture whipped to a stiff peak consistency using a Black & Decker hand-held mixer. The still-hot foamed composition was divided into 2 plastic film lined paper salad bowls. The foams were covered with plastic wrap and another set of the paper salad bowls were used to press the foam into bowl-shape. After being refrigerated for one hour, the top bowl and the plastic film were removed and the gelled foamed mixture was dried in a 205° F. convection oven. The resulting dry product remained foamy and light, but was more flexible than desirable. A small amount of added flour would probably have given the proper stiffness and imparted more strength.

Example 35 i-carrageenan/Flour

Using a 2-l glass measuring bowl, 12 g of iota-carrageenan (FMC SeaSpen® PF, lot 20712) was dispersed in 400 ml of water using a Rival hand-held blender. The bowl was covered with plastic film and the contents heated to boiling in a microwave oven.

To 100 ml of the 3% iota-carrageenan sol was added 1 ml of glycerin, 1 ml of Ajax® dish fluid detergent, and the mixture whipped to a stiff peak consistency using a Black & Decker hand-held mixer. While still-hot, a slurry of 10 g of wheat flour in 10 ml cold water was added and the mixture whipped again to stiff peaks. The foamed composition was transferred to a plastic film lined round glass baking dish, the dish was covered with plastic wrap, and refrigerated for 1.5 hours to gel the carrageenan. The plastic film cover was removed and the material was dried in a 170° F. convection oven. The dried foam composition was airy, but lacked cohesive strength.

Example 36 i-Carrageenan/Paper Fiber/Flour

To another 100 ml of the hot 3% iota-carrageenan sol (from Example 30) was added 1 ml of glycerin, 1 ml of Ajax® dish fluid detergent, and the mixture whipped to a stiff peak consistency using a Black & Decker hand-held mixer. While still-hot, 6 g (dry wt.) of sieved, wet macerated toilet paper (see Example 2) was added followed by a slurry of 10 g of wheat flour in 10 ml cold water. The mixture was again whipped to stiff peaks. The foamed composition was transferred to a plastic film lined round glass baking dish, the dish was covered with plastic wrap, and refrigerated for 1.5 hours to gel the carrageenan. The plastic film cover was removed and the material was dried in a 170° F. convection oven. The dried foam composition was significantly stronger than without the fiber (Example 30).

Curdlan Gel Foam-based Matrices

Curdlan is an interesting 1,3-beta glucan that is produced by fermentation by Takeda. It is soluble in weak base and is precipitated by acidifying. Gels can be formed by heating an aqueous slurry to >75° C. The gels are boiling water stable. Another way to form gels is to dissolve the curdlan in weak base (0.05M NaOH), heat the sol to 50-55° C. and neutralize or acidify the sol. At this temperature, the curdlan does not precipitate but remains a sol. This sol will form a thermo-reversible gel if cooled to >35° C. This gel can be transformed into a boiling water insoluble gel by heating to >75° C. If the 50-55° C. curdlan sol is heated directly to >75° C., the thermo-irreversible gel forms directly. Many fungi contain 1,3 beta-glucanases so biodegradation should occur with the products Example 37

Heat-set Curdlan Foam Based Matrix with Paper Fiber

Using a 2-liter glass measuring bowl, 10 g of curdlan (Takeda lot J002A), 200 ml of water, 2 ml of glycerin, 2 ml of Ajax® dish fluid detergent, and 6 g (dry wt.) of sieved macerated toilet paper (see Example 2) were whipped to stiff peak consistency using a Black & Decker hand-held mixer. This foamed mixture was spread into a plastic film lined round glass baking dish. The dish was covered with plastic film and the mixture heated for 4 minutes in a microwave oven. The covering plastic was removed and the foam dried in a 170° F. convection oven The resulting material was somewhat crumbly but an interesting start. Instead of a microwave oven, it would be better to set the curdlan in a boiling water bath. The microwaved material was interesting in that was a mixture of sticky coated particles. This may be a useful lead. Perhaps it could be a natural, biodegradable adhesive for cellulosic waste materials.

Example 38

Curdlan Foam Set with Acid

Using a 2-l glass mixing bowl, 5 g of curdlan (Takeda lot J002A) was dissolved in 200 ml of 0.1M NaOH to give a 2.5% sol. To 100 ml of this curdlan sol was added 2 ml of glycerin, 2 ml of Ajax® dish fluid detergent, and 6 g (dry wt.) of sieved, macerated toilet paper (see Example 2). This mixture was whipped to stiff peak consistency using a Black & Decker hand-held mixer. About 10 ml of white vinegar was added rapidly and mixed in. The resulting foam was spread on two paper bowls that were covered with plastic film. These were dried in a 180° F. convection oven. The resulting bowls had a fibrous foam consistency—too open to be practical, but interesting.

Example 39

Curdlan Foam Prepared by Critical Temperature Neutralization

The other 100 ml portion from D3 was placed in a 2-l glass mixing bowl and heated to 150° F. The curdlan sol was held at that temperature using a hot water bath. Using white vinegar, the sol was neutralized using pH paper. The bowl and contents was maintained at 140-150° F. while adding 2 ml of glycerin, 2 ml of Ajax® dish fluid detergent, and 4 g (dry wt.) of wet sieved macerated toilet paper. This mixture was whipped to stiff peak consistency using a Black & Decker hand-held mixer. The resulting foam was spread on two paper bowls that were covered with plastic film. These were dried in a 180° F. convection oven. The texture and strength of resulting bowls was good, but there were a few weak spots. It probably would have been better to chill the foam to give a cold set gel and then to heat this to transform it to and insoluble gel foam, rather than heat setting the curdlan directly.

Chitosan Gel Foam-based Matrix

Example 40

Chitosan.HCl/Lime

A 1% chitosan hydrochloride sol was prepared by dissolving 2 g of chitosan.HCl (SeaCure CL210) in 200 ml of water in a 2-l glass mixing bowl. To this was added 2 ml of glycerin, 4 ml of Ajax® dish fluid detergent, and 8 g (dry wt.) of sieved, wet macerated toilet paper (see Example 2). Because of the acidity, little foam appeared upon whipping with a Black & Decker hand-held mixer. One tablespoon of garden lime was added and whipped into the mixture. The partially particulated mix was put into a plastic film lined paper bowl and dried in a 170° F. convection oven resulting in a hard, partially-collapsed foam. A non-ionic detergent would have created a better foamed gel matrix.

Example 41

Chitosan/Alginate/HPC

A 1.5% chitosan acetate sol was prepared in a 2-l glass measuring bowl by dissolving 7.5 g of chitosan (BioChem® squid chitosan 13/11/01) in 500 ml of water to which 50 ml of white vinegar was added. A Rival hand-held blender was used to assist the dissolution. The bowl was covered with plastic film and heated to boiling in a microwave oven. The film cover was removed and the sol again blended to dissolve the few remaining insoluble particles. To 100 g of the 1.5% chitosan acetate sol was added 20 g of a 5% sol of hydroxypropyl cellulose (Hercules LF, lot 8931) and the mixed sols whipped to a foam using a Black & Decker hand-held mixer. To set the gel, 50 g of a 2% alginate sol (ISP Alginates Manugel DMB, lot 220732) was added and very rapidly whipped into the foam. Concentric bowls were treated with a 5% sol of PVA (Air Products WS-42) as a mold release and used to mold the whipped mixture. The bowls were covered with plastic film let stand at room temperature to complete the ionic reaction forming a chitosan/alginate gel. After one hour, the outer mold was removed and the inner mold with the gelled foam mixture on the outside inverted. This were dried in a convection oven set at 175° F. When nearly dry, the bowl was removed from its mold and drying was finished in the convection oven. The bowl had interesting properties. It needs some bodying material but illustrates the potential of the composition.

Example 43

Alginate/Chitosan/Paper Fibers

A 2% sodium alginate (ISP Alginates, Manugel DMB, lot220732) sol was prepared in a 2-l measuring bowl by dispersing 2 g of the alginate powder in 100 ml of water using a Rival hand-held blender. The bowl was covered with plastic wrap and the contents brought to boiling in a microwave oven. Blending was repeated and the sol was allowed to cool to room temperature. To this was added 1 ml of glycerin, 1 ml of Ajax® dish fluid detergent, and 8 g (dry weight) of sieved, macerated in hot water, toilet paper. This mixture was whipped to stiff peak-consistency using a Black & Decker hand-held mixer set at high speed. To this was added 70 g of a 2% chitosan sol (see Example 36 for preparation) which was rapidly whipped in. The foamed composition was transferred to a plastic film lined round glass baking dish and the dish covered with plastic wrap. This was heated at 195° F. for one hour to insure that the alginate/chitosan gel-forming interaction occurred. The plastic film cover was removed and gelled foam dried in a 175° F. convection oven. The resulting product was light in consistency and firm. Similar results can be obtained using a carrageenan/chitosan formulation.

Galactomannan/Xanthan Foam-based Matrices

Example 44

Locust Bean Gum/Xanthan Foam

A mixture of 150 ml of a 2% locust bean gum (T.I.C. Gums) sol, 150 ml of a 2% xanthan (T.I.C. Gums) sol, 3 ml of glycerin, and 3 ml of Ajax dishwashing fluid was heated to boiling and whipped to stiff peak consistency. The foam was poured into a plastic film lined baking dish, covered with plastic film and refrigerated to set the gel foam. After one hour, the cover was removed and the foam dried in a 170° F. convection oven. The somewhat compressed product was strong and flexible—unsuitable for use as a biodegradable container matrix.

Example 45

Locust Bean Gum/Xanthan/Paper Fiber/Flour

To 300 ml of water containing 3 ml glycerin, in a 2-l mixing bowl, was added a dry mixture of 9 g of LBG (T.I.C. Gums, POR/A Powder, lot 5650) and 9 g of xanthan (T.I.C. Gums, TICAXAN® clear powder, lot 502335). The mixture was made homogeneous using a Rival hand-held blender. After covering the bowl with plastic film, the contents were heated to boiling in a microwave oven. To this was added 3 ml of Ajax dishwashing fluid and the mixture blended again. Using the Black & Decker hand-held mixer, the sol was whipped to stiff peaks. Paper fiber was prepared by placing 18 g of toilet paper in hot water, macerating with the Rival hand-held blender, then collecting it on a sieve. This was added to the whipped sol after re-heating in the microwave oven. The mixture was again whipped to stiff peaks. 15 g of wheat flour was slurried in 20 ml of cold water, added to the mixture and the mixture again whipped to stiff peak consistency. This was distributed into PVA-coated (see Example 36) concentric cups and bowls, covered with plastic film and refrigerated to set the gel foam. The outer cups/dishes were removed, the inner cups with the gelled foam inverted, and the molded cups and bowls dried in a 170° F. convection oven. When nearly dry, the molding cups/bowls were removed and drying completed. After trimming the rough top edges, the cups and bowls were coated with NuCoat® 6616B, using a paint brush. Curing was done in a 250° F. oven. The finished bowls and cups held boiling water for 20 minutes without softening and were able to support microwave heating of cold water to boiling.

Example 46

Guar Gum/Xanthan/Flour

A mixture of 200 g of a 2% sol of guar gum (T.I.C. Gums), 160 g of a 2% sol of xanthan (T.I.C. Gums), 3 g of glycerin, and 4 ml of AJAX dishwashing fluid was heated to boiling and whipped to a stiff peak consistency using a Black and Decker mixer. A slurry of 15 g of unbleached flour in 30 ml of cool tap water was added and whipped into the mixture. The foam was poured into a plastic film lined baking dish, covered with plastic film and refrigerated to set the gel foam. After one hour, the cover was removed and the foam dried in a 170° F. convection oven. The somewhat compressed product was tough and flexible—unsuitable for use as a biodegradable container matrix.

Gellan Gel Foam-based Matrix

Example 47

Gellan/Cellulose Fiber/Flour

Six grams of CP Kelco KelcoGel® gellan (Lot: #H1502A) was added to 300 ml of cool tap water and allowed to swell for about 15 minutes. This mixture was blended with a Rival hand-held, high shear blender then heated to boiling using a microwave oven. After adding 1.5 ml of glycerin and 3 ml of Ajax dishwashing fluid, the mixture was whipped to stiff-peak consistency using a Black and Decker hand-held mixer. To this was added 18 g of CreaTech® TC 2500 cellulose fiber (Creafill Fibers, Chestertown, Md.), pre-hydrated by adding sufficient 190° F. water to cover the fiber, blending with a Rival hand-held, high-shear blender, then sieving to remove the excess water. Fifteen grams of flour, slurried in 30 ml of cool tap water, was added and mixed in thoroughly using the Black and Decker mixer. Two bowls and two cups were molded in concentric molds. These were covered with plastic wrap and refrigerated for one hour then un-molded, leaving the gel foams on the outer mold. These were dried in a 170° F. convection oven. Although some melting occurred before drying occurred and a lower temperature should have been used for drying, the dry products had an excellent consistency.

Low-methoxy Pectin Gelled Foam-based Matrix

Example 48

Low-methoxyl Pectin/Cellulose Fiber/Flour/TSPP/CaSO$_4$

A 2% low-methoxyl pectin sol (Cargill Cerestar Citrus Pectin E-440, LM amidated pectin unstandardized)) was prepared by suspending 6 g of the pectin in 300 ml of cool tap water using a Rival hand-held blender. This was heated to boiling using a microwave oven. After adding 3 ml of glycerin and 3 ml of Ajax dishwashing fluid, the mixture was whipped to stiff peak consistency using a hand-held Black and Decker mixer. After adding 1 g of tetrasodium pyrophosphate, as a set time modifier for the CaSO$_4$, and 18 g of CreaTech® TC 2500 cellulose fiber (Creafill Fibers, Chestertown, Md.), pre-hydrated by adding sufficient 190° F. water to cover the fiber, blending with a Rival hand-held, high-shear blender, then sieving to remove the excess water, the mixture was again whipped. A dry mix of 8 g of CaSO$_4$ and 15 g of flour was slurried in cool tap water and added to the mix. The mixture was again whipped thoroughly. The foamed mixture was poured in between two concentric bowl molds and a plastic-lined baking dish. These were covered with plastic wrap and let stand at room temperature for one half hour to set. The plastic film covers were removed and the inner bowl of each mold was removed. Drying was done in a 170° F. convection oven. Some melting occurred before drying and a lower temperature should have been used. However, the dry bowls and flat piece had an excellent consistency.

Biodegradable, Hot Water Resistant Coatings

The hot water and/or grease resistant coatings can be applied to the surfaces before or after drying or possibly can be an integral part of the matrix formulation, such as incorporating the water-based latexes NuCoat or VaporCoat in the foams.

Example 49

Corn Zein

Corn zein is a yellow, natural hydrophobic proteinaceous material that is hot-water insoluble. It is soluble in the water-miscible alcohols and can be deposited from mixtures of these with water. A thick slurry of corn zein (Freeman Industries Regular Grade, lot F40005112-C) was prepared in 70% isopropyl alcohol. The zein was dissolved by heating the mixture. One of the bowls was coated thoroughly with this sol and dried at 175° F., When filled with 190° F. water, no leakage or softening occurred after 20 minutes.

Example 50

Chitosan-NaOH

Chitosan is made from chitin by treating shellfish shells with alkali to deacetylate the chitin. It is a polymer of glucosamine that is soluble in acid at pH 5.5 or below. When this sol is neutralized or made alkaline, the chitosan becomes insoluble and if heated, becomes water-resistant, as well. A small biodegradable cup was coated by filling with a 1% chitosan.HCl sol. After 10 minutes this was removed and replaced with a 0.25M NaOH solution. After 10 minutes, this was removed and the inside of the cup washed with water. After drying at 175° F., the dry cup remained intact, without softening, when hot water was added.

Example 51

Ethyl Cellulose

Ethyl cellulose is a pharmaceutically acceptable cellulose derivative that is insoluble in hot water, but soluble in 70% isopropyl alcohol. Although it has not yet been tried for biodegradable cups, trays, or bowls, its solubility was checked. The ethyl cellulose checked was Aqualon ECN22, lot 44221. When heated with 70% isopropyl alcohol, it became soluble and remained in solution upon cooling.

Example 52

Curdlan

Curdlan is an interesting 1,3-beta glucan that is produced by fermentation by Takeda. It is soluble in weak base and is precipitated by acidifying. Gels can be formed by heating an aqueous slurry to >75° C. The gels are boiling water stable. Another way to form gels is to dissolve the curdlan in weak base (0.05M NaOH), heat the sol to 50-55° C. and neutralize or acidify the sol. At this temperature, the curdlan does not precipitate but remains a sol ("critical temperature neutralization"). This sol will form a thermo-reversible gel if cooled to >35° C. This gel can be transformed into a boiling water insoluble gel by heating to >75° C. If the 50-55° C. curdlan sol is heated directly to >75° C., the thermo-irreversible gel forms directly. The critical temperature neutralized sol can be dried at a temperature >75° C. to give a hot-water insoluble coating. A foam slab was coated with the critical temperature neutralized sol and dried at 200° F. Hot-water resistance was observed.

Example 53

Deacetylated Konjac

Konjac is an acetylated glucomannan. As such, it forms a sol in water. By heating with a basic reagent, de-acetylation can be effected. The resulting deacetylated konjac is hot-water insoluble. The gel strength of deacetylated konjac varies inversely with the temperature and will form a liquid at about 4° C. If this liquid is heated to 25° C. or higher, a hot-water insoluble gel forms. Therefore, there are two methods for coating using konjac: 1) using a room temperature mixture of konjac sol and an alkali then heating the coated article to 190° F. or higher to deacetylate the konjac followed by drying, and 2) using a cold-melt konjac sol and drying the coated article at 195° F. The first method was done and the second method remains to be tried.

One ml of 1M NaOH was added 100 ml of a 1% konjac sol at room temperature. After mixing thoroughly, this was used to coat a biodegradable bowl. The bow was covered and set in a 200° F. oven for one hour, uncovered and dried at 175° F. The dried bowl was tested with by filling with 180° F. water. After ½ hour, there was no leaking. There was some softening, but the bowl could be picked up and held. Since polysaccharide film water solubilities decrease significantly upon heating to higher temperatures, the effect of this drying at a higher temperature should be tried.

Example 54

Hydroxypropyl Cellulose

HPC is a cellulose derivative with unusual properties. It is soluble in cold water, but insoluble in hot (>80° C.) water. It is soluble at all temperatures in an isopropyl alcohol/water mixture. A deacetylated konjac foam-based bowl was coated with a 4% HPC sol. This was dried in a 175° F. convection oven, re-coated and re-dried. The coated bowl exhibited excellent hot-water resistance but softened a bit as the temperature of the water approached room temperature. May be good in combination or if heated at a higher temperature to make the coating more refractive.

Example 55

Shellac

Shellac is a natural product that is biodegradable and comes in edible grades.

A deacetylated konjac foam-based bowl was coated with shellac (Sherwin-Williams Pigmented Shellac: Pure shellac in denatured alcohol containing titanium oxide—55% and aluminum silicates—49%) and dried. The coated bowl held boiling water for about ten minutes, but then apparently the water found a crack in the coating. After drying, additional shellac was applied and dried. The bowl coating was hard and white, but did hold boiling water satisfactorily for about 20 minutes.

Example 56

Michelman VaporCoat® 2200R

Michelman is a major producer of coatings for the paper industry. One of their products, VaporCoat® 2200R, is supplied as a water-based, non-toxic latex. The coating cures at 300° F. and the cured coating is hot-water stable and biodegradable. It is FDA compliant under CFRs 176 &180. Samples of both agar gelled foam—based and deacetylated konjac gelled foam-based cups, bowls and trays were coated with VaporCoat® 2200R using a paint brush. The coatings were cured in a 220° F. convection oven. After curing, all containers held boiling water for 20 minutes without softening and could be used to heat cold water to boiling in a microwave oven without any negative effects. It may be possible to cure the coating material using microwaves.

Example 57

NuCoat®6661B

NuCoat®6661B is similar to the Michelman VaporCoat®2200R in that is a water-based latex that is heat cured, non-toxic, FDA approved for food and beverage contact, and biodegradable. Curing is a time/temperature function with curing complete when the temperature reaches 250° F. NuCoat®6661B was used to coat locust bean gum/xanthan gelled foam-based cups and bowls. The material was applied with a paint brush and cured in a 250° F. convection oven. The coated cups and bowls were resistant to the effects of boiling water for ½ hour and withstood heating cold water to boiling in a microwave oven. This coating material can be cured using microwaves and addition of titanium dioxide gives a bright white coating.

Example 58

Microwave Curing of NuCoat®6661B

The inside of an agar/paper fiber/flour bowl was coated with NuCoat 6661B and cured in a microwave oven within 25 seconds. The bowl held several changes of boiling water without softening.

Example 59

Ulterion® Paper Coatings

The following Ulterion coatings were used to coat small pieces of an alginate formulation: 590 SGX, 537 SWH, and 810 RC. These were cured using a microwave oven and imparted hot-water resistance to the foam matrix.

Incorporation of Coating in Mix

Example 60

Agar/HEC/Flour/VaporCoat/TiO$_2$

Eight grams of agar (Marine BioProducts, Plant growth agar) was dispersed in 200 ml of water containing 2 ml of glycerin and 2 ml of Ajax dishwashing fluid. After heating to boiling in a microwave oven, 4 g of hydroxyethyl cellulose (Hercules 250 HR) in 60 ml of cold water was added and the mixture blended using a Rival hand-held blender. This mixture was heated to boiling (microwave oven) and whipped to stiff peak consistency using a Black and Decker mixer. To this was added 8 g of flour slurried with 20 ml of cold water and a level teaspoon of Sherwin and Williams white tinter (TiO$_2$) and the mixture was whipped to stiff peaks. After adding 20 ml of VaporCoat 2200R the mixture was again whipped to stiff peak consistency. This foamy mixture was spread into a plastic film lined rectangular baking dish, covered with plastic film, and refrigerated to gel the foam. The gelled foam was molded over the bottom of an inverted bread pan and partially dried in a 170° F. convection oven. When nearly dry, the oven temperature was increased to 250° F. to cure the VaporCoat. The dried foam exhibited partial hot water resistance—significantly better than a foam without the VaporCoat.

Example 61

Alginate/Lime/VaporCoat/TiO$_2$

Four grams of ISP's Manugel DMB alginate was dissolved in 200 ml of water by first dispersing it using a Rival hand-held blender, then heating to boiling in a microwave oven. After adding 2 ml of glycerin and 2 ml of Ajax dishwashing fluid, the mixture was whipped to stiff peak consistency using a Black and Decker mixer. One-third of a teaspoon of Sherwin-Williams white tinter (TiO$_2$) was added and the mixture again whipped. A mixture of 4 g of lime and 8 g of flour (dry) was added and the mixture again whipped. This foamy mixture was put into a plastic film lined baking dish, the dish covered and allowed to stand for one hour at room temperature to react. The plastic film cover was removed and the foam dried at 250° F. in a convection oven. The foam collapsed, but the remaining solid was insoluble and did not swell in boiling water.

While specific embodiments of the present invention have been described, it will be apparent to those skilled in the art that various modifications thereto can be made without departing from the spirit and scope of the invention as defined in the appended claims.

What is claimed is:

1. A biodegradable container comprising:
    a body structure formed into a desired shape, wherein said body structure is made of a dried foamed hydrocolloid gelling matrix system having a fibrous material and a firming agent embedded therein; and
    a water-resistant coating disposed on a surface of said body structure.

2. The biodegradable container of claim 1 wherein said coating covers the entire surface of said body structure.

3. The biodegradable container of claim 1 wherein said coating covers only a portion of the surface of said body structure.

4. The biodegradable container of claim 1 wherein said coating is made from one or more materials for contact with human comestibles.

5. The biodegradable container of claim 4 wherein said one or more materials are selected from the group consisting of zein, chitin, hydrophobic derivatives of biopolymers, waxes, food grade shellacs, food grade lacquers.

6. The biodegradable container of claim 1 wherein said body structure and said coating are able to withstand microwave heating.

7. The biodegradable container of claim 1 further comprising a whitening or coloring agent incorporated in said coating.

8. A method of making an article, said method comprising:
    providing a biodegradable composition comprising a mixture of a foamed gelling hydrocolloid system, a firming agent, and a fibrous material;
    causing said composition to gel in a desired shape to produce a body structure;
    drying said body structure; and
    applying a water-resistant coating to said body structure.

9. The method of claim 8 wherein providing a biodegradable composition includes adding one or more hydrocolloid gelling agents, one or more firming agents and a fibrous material to solution and foaming said solution.

10. The method of claim 9 further comprising adding a foaming agent to said solution.

11. The method of claim 9 wherein the concentration of said one or more hydrocolloid gelling agents in solution is about 0.5 percent by weight to about 6 percent by weight, the concentration of said one or more firming agents in solution is about 2 percent by weight to about 20 percent by weight, and the concentration of said fibrous material in solution is about 2 percent by weight to about 30 percent by weight.

12. The method of claim 9 wherein said one or more firming agents and a fibrous material are pre-hydrated prior to being added to said one or more hydrocolloid gelling agents.

* * * * *